Sept. 4, 1956  E. B. WILSON  2,761,979
PROTECTION OF PIPE LINES
Filed April 3, 1953  2 Sheets-Sheet 1

INVENTOR.

Sept. 4, 1956 E. B. WILSON 2,761,979
PROTECTION OF PIPE LINES
Filed April 3, 1953 2 Sheets-Sheet 2
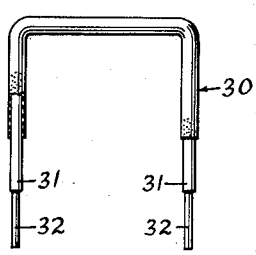
FIG.5.
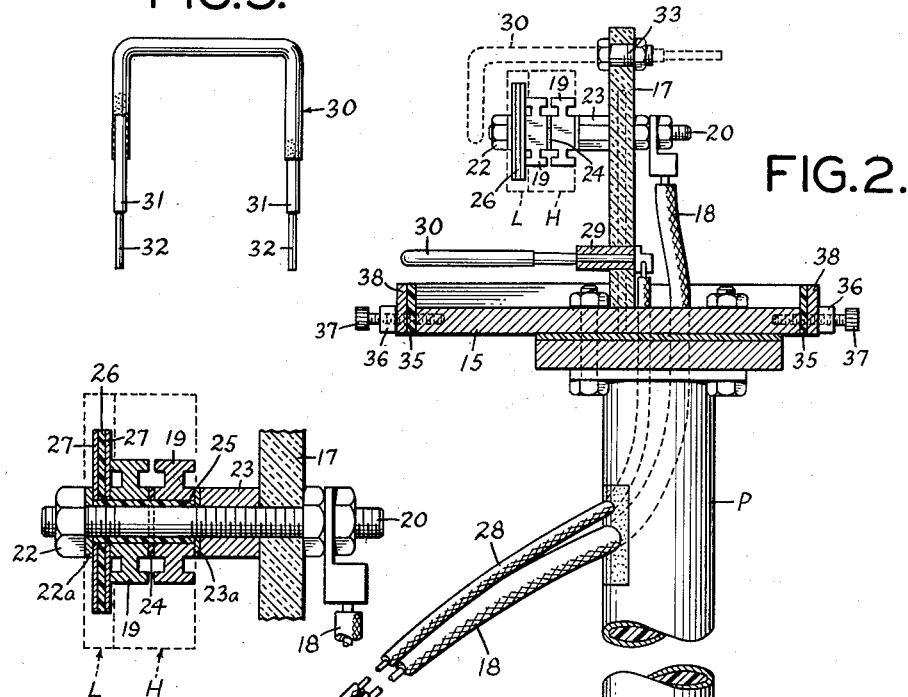
FIG.2.
FIG.3.
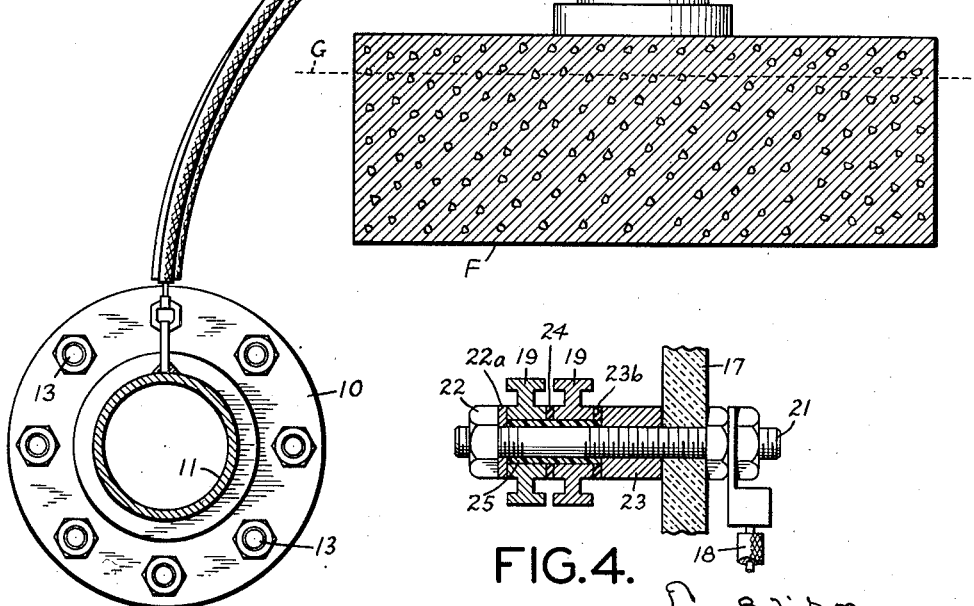
FIG.4.
INVENTOR.

United States Patent Office 2,761,979
Patented Sept. 4, 1956

2,761,979
PROTECTION OF PIPE LINES

Edward B. Wilson, Beechwood, Pa., assignor to The Barlow Corporation, Philadelphia, Pa., a corporation of Pennsylvania Application April 3, 1953, Serial No. 346,633

2 Claims. (Cl. 307—95)

The present invention relates to protection of pipe lines from electrical currents. More particularly, it is concerned with devices for preventing damage to pipe joints by reason of such currents.

It has become practice in construction of pipe lines, especially those for gas or petroleum products, to provide at suitable intervals during their course electrically insulated joints, adapted to withstand internal or line pressure and other conditions characteristic of the line and of its surroundings. Such joints have become necessary to protect pipe line portions from the destructive effect of certain types of electrical current to which the pipe is subjected. For example, differences in ground potential of substantial magnitude sometimes are caused by the differences in the nature of the earth or other medium on or within which adjacent portions of the pipe line rest, resulting in undissipated currents at localized areas of the type which cause destruction of the pipe by electrolysis and other processes. The electrically insulated joints minimize the destructive effect of such currents.

However, conditions of relatively frequent occurrence, for example electrical storms, leakage to the ground from transmission lines or utility power supply lines and complete or partial grounding of such lines by reason of storms or accident, result in imposition, sometimes only instantaneously, of sufficiently high voltage on such insulated joints to cause partial or complete destruction of their insulating properties. In order to avoid the expense of disconnecting joints so affected, including uncovering the joint when the pipe line is under ground, for replacement of damaged parts, with attendant interruption of service, it has become customary to place in easily accessible location adjacent such insulated joints a device providing a gap or other suitable insulating means calibrated to break down at voltage differential thereacross substantially below that which the joint insulation withstands. High voltage discharge across such device permits current flow between the adjacent pipe sections separated by the insulated pipe joint and its dissipation to ground, but the affected parts of the device require inspection and repair or replacement.

During the time necessary for servicing of such devices the insulated pipe joint has remained unprotected from high voltage charges. In addition, the workman performing the necessary operations on it has been subjected to the hazard of dangerously high electrical potentials.

One object of the present invention is to avoid leaving insulated pipe joints unprotected from high potential current at any time. Another object is elimination of shock hazards to personnel engaged in pipe line maintenance. Another object is improved equipment for protecting insulated pipe line joints. Still other objects will be apparent from detailed description which follows.

A concrete embodiment of the invention is indicated in the accompanying drawings in which:

Fig. 2 is a sectional elevation taken substantially along line 2—2 of Fig. 1;

Fig. 3 is a section substantially along line 3—3 of Fig. 1 of a portion of the protective device;

Fig. 4 is a section substantially along line 4—4 of Fig. 1 of another portion of that device;

Fig. 5 shows a preferred type of shunt bar employed in the protective device.

Figures 1, 6:
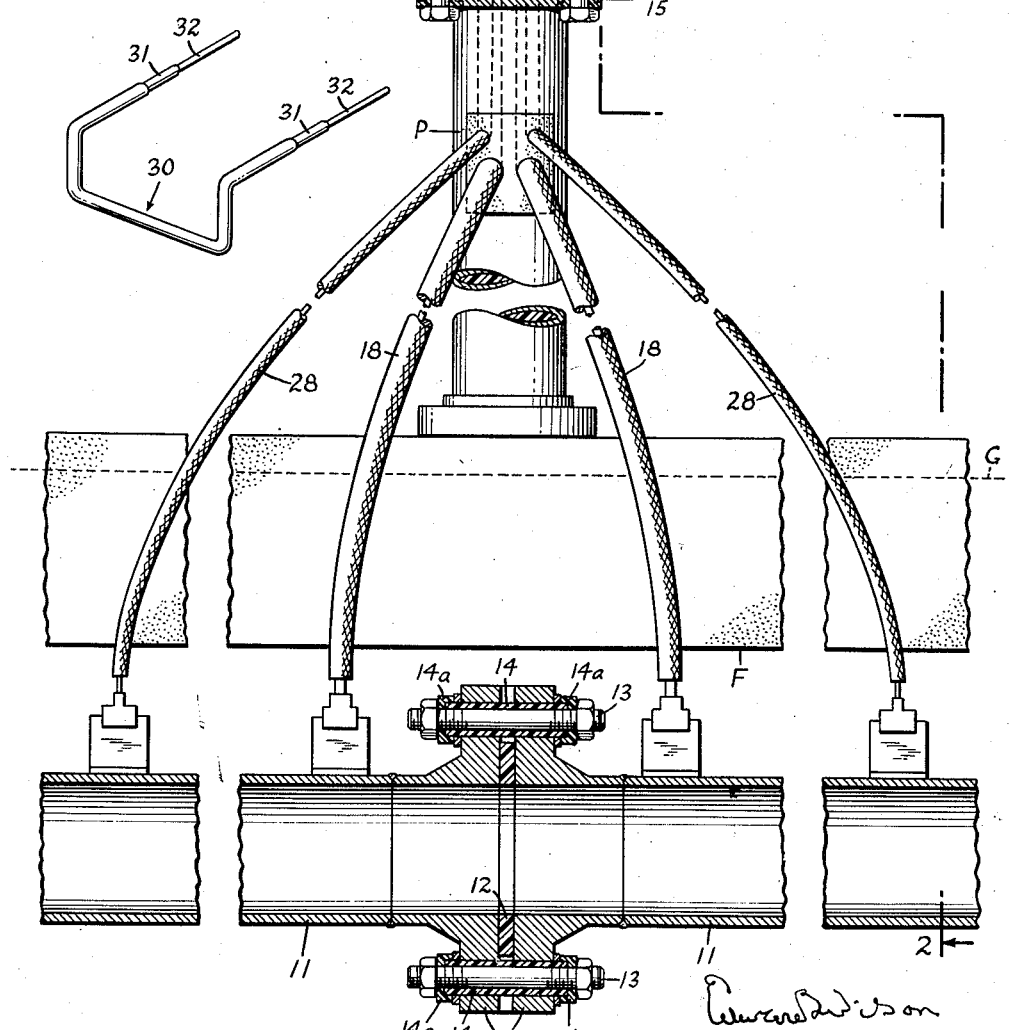
Fig. 1 is a diagrammatic showing of a typical insulated pipe joint together with a protective device in operative relation therewith.
Fig. 6 shows a modified type of shunt bar.

Referring to the drawings, and particularly to Figs. 1 and 2 thereof, there is shown in section a typical insulated pipe joint comprising matched bolted flanges 10 between adjacent portions of pipe line 11 which may be a suitable distance below ground line, indicated generally at G. Between the flanges there is interposed a suitable insulating gasket 12, for example, of laminated phenolic resin or other suitable insulating material. In addition, around flange bolts 13, as well as between the heads of those bolts or the nuts thereon and the flange faces, suitable insulating spools 14 and washers 14a, respectively, are provided. By preference, the insulating elements 12, 14 and 14a are adapted to withstand differences of electrical potential between the adjacent sections of pipe 11 of 1,000 volts or higher, for example up to 20,000 volts.

Disposed in the vicinity of the pipe joint, for example above and somewhat to one side of the pipe line, is foundation F which supports pedestal P and the latter, in turn, supports platform 15 and superposed removable housing or cover 16 therefor. Platform 15 and cover 16, as shown, cooperate to enclose and to shield from the elements a protective device of suitable design electrically connected to each of the pipe sections adjacent the insulated joint.

As shown, the protective device may comprise a suitable panel such as vertical panel 17 which, for convenience, may be formed of a suitable insulating material having adequate structural strength, for example, Bakelite or a resin-bonded panel board, bolted or otherwise rigidly fastened to platform 15. Supported by panel 17 and connected in series with the adjacent sections of pipe 11 by electrical leads 18 is a suitable device, indicated generally at H, adapted to prevent passage of current between the adjacent pipe sections at voltages up to a predetermined level, for example, 50% to 60% of the voltage which insulating gasket 12 and spools and washers 14 and 14a will withstand. This device may, and conveniently does, assume the form of a calibrated gap provided between parallel metal, preferably copper, busses or bars 19 (Figs. 2 and 3).

Upon imposition of sufficiently high voltage across the gap, the current arcs across or bridges the same to be dissipated to the ground from the pipe section at low potential. When such bridging occurs, it is accompanied, if the gap is insulated, by break down of such insulation or, if it is not, by flow of metal from the bus at high potential toward the other, in either event resulting in its reduced effectiveness. In order to permit ease of inspection of the gap as well as economical maintenance, it is preferred that the spaced bus bars be readily accessible and demountable to permit replacement of insulation between them or their buffing, reversal or replacement, as desired or required to restore the gap to original condition after discharge across it has occurred.

To this end the bars may be mounted parallel to and in front of panel 17, as shown, on terminals shown as bolts 20 and 21 suitably anchored to panel 17 and extending in turn through suitable spacers 23 and apertures in bus bars 19 to terminate with threaded portions having nuts 22 thereon (Figs. 2, 3 and 4). The bus bar 19 which is nearer panel 17 and that further removed therefrom are electrically connected, respectively, to bolts 20 and 21 providing the desired in series relationship of the electrical gap to leads 18. This may be accomplished by use over bolt 20 of suitable conductive washer 23a disposed between spacer 23 and the next adjacent bus bar 19 and by a similarly located insulating washer 23b, for example, of a laminated phenolic material disposed over bolt 21 while maintaining bolt 20 insulated from and bolt 21 in conductive relation with the other bus bar 19. To complete the desired conductive and insulated relationships spools 25, for example, of laminated or molded phenolic resin, are interposed between each of bolts 20 and 21 and each of busses 19, and suitable insulating spacers, for example, insulating washers 24, are disposed over the bolts and between the individual busses 19. Such washers (or, if the gap is to be insulated perforated sheets entirely separating busses 19) may be of calibrated mica sheets.

Nuts 22 when in tight engagement with the outer face of the outer bus bar, preferably with intervening washers 22a, hold the entire assembly in operative condition, and, upon their removal, permit its dismantling easily and quickly for purposes of service and maintenance of the protective instrument.

Although there may be interposed a suitable insulating washer at the outer end of bolt 20 between the outer bus bar and nut 22, a preferred form of electrical device of the type shown substitutes therefor a device indicated generally at L (Fig. 2) which is adapted to permit passage of electrical current therethrough at low voltages as, for example, up to 10 or 15 volts, but which breaks down and ceases to be a conductor at higher voltages up to the bridging voltage of the gap between busses 19. In such event, there is provided a complete electrical path for such low voltage currents between the adjacent sections of pipe 11 through leads 18, bolt 20, device L, the bus 19 furthest removed from panel 17, and bolt 21. When device L is subjected to voltages above its rating, it interrupts the circuit and ceases to by-pass the calibrated gap between bus 19. Device L may be a suitable fusible linkage. Preferably, as indicated in detail in Fig. 3, it comprises a disc 26 of suitable material such as Thyrite which offers decreasing resistance with increasing low voltages but shatters when subjected to high potential. Thyrite (a registered trademark of General Electric Company) is silicon carbide pressed with a ceramic binder at high pressure and subsequently fired at high temperature. As shown, disc 26 is placed over insulating bushing 25 and is maintained in conductive relationship with bolt 20 by means of nut 22, metallic washer 22a and the larger retaining metal washers 27.

In accordance with the invention, a protective device of the type described hereinabove is provided with a suitably disposed shunt circuit adapted to by-pass both the insulated pipe joint and the protective device therefor, which is open or incomplete except during periods when the protective device is undergoing inspection or maintenance. As shown, the shunt circuit comprises leads 28 from adjacent sections of pipe 11 connected to suitably spaced receptacles 29 mounted on panel 17, located preferably below busses 19 at distance sufficient to permit assembly and disassembly of the structure containing the latter. To complete the shunt circuit, jacks adapted for use with receptacles 29, which are connected by an electrical conductor, are inserted into the receptacles. In preferred form of the invention, the jacks and connecting conductor are in the form of a stiff U-shaped member 30 (Figs. 5 and 6). Member 30 is shown in operative position; that is, inserted into receptacles 29 in Fig. 2 and, as shown, preferably has legs of sufficient length that in such position it extends beyond the area normally enclosed by housing 16. Hence, when the protective device is opened and the shunt is in use, the housing 16 cannot be replaced without removal of the shunt with resulting opening of the shunt circuit and placement of the protective circuits into service.

As shown in Fig. 5, the shunt bar preferably provides a shank portion 31 of somewhat larger diameter than jack portion 32 disposed immediately adjacent the latter on each of its legs. Suitable bushings 33 or other receptacle adapted to receive each shank portion 31 are mounted on panel 17 above the protective assembly. Then the shunt member 30, when not in use, may be supported by panel 17 after its insertion within bushings 33 as indicated by broken lines in Fig. 2. As shown in that figure, shank portion 31 is preferably of such dimension, as is each leg of the U-shaped shunt, that the entire shunt, when so supported, is entirely enclosed by housing 16 when the latter is fastened in place.

As shown in Fig. 6, shunt member or bar 30, instead of being simply U-shaped, may provide the cross portion of the U in a position sufficiently offset from the jack ends of the legs so that when it is in the rest or non-operative position the cross portion extends across the protective assembly, necessitating removal of the bar before disassembly of the protective parts. To this end, the legs of the U may be suitably bent. A shunt member of this type is indicated diagrammatically by broken lines in at rest position in Fig. 1.

When protective devices such as indicated generally at L and H in Fig. 2 are subjected to sufficiently high voltage to cause them to break down, there is usually arcing across portions of the parts affected, resulting in sudden increase in temperature and pressure of the atmosphere within the enclosure provided by platform 15 and housing 16. Such increases in pressure often result, unless suitable precautions are taken, in damage to portions of the installation. In order to prevent such damage while protecting the electrical equipment from atmospheric moisture, it is preferred that housing 16 be demountably attached in water-tight engagement with platform 15 in such manner that upon such discharge occurring only a slight increase in pressure within the enclosed volume will cause automatic dislocation of the housing. To that end, the joint between housing 16 and platform 15 may be formed by suitable pressure applied through an easily deformable gasket. According to preferred construction of the enclosure for the protective assembly, housing 16 proper is of smaller lateral dimension or diameter than the dimensions of matching portions of platform 15 and has up-turned bottom side portions 34 which extend substantially to the edges of platform 15 to be coextensive therewith and to provide matching end faces. Then the desired water-tight yieldable joint may be completed by application of pressure to rubber gasket 35, extending entirely around the coextensive edges of the housing and platform while engaging both of them, by means of wing nuts 36 mounted on studs 37 being tightened to the desired extent against pressure bars 38 which also extend substantially around the entire periphery of the gasket assembly.

Panel 17 may comprise a pair of separated sections abutting on a horizontal line between receptacles 29 and terminal bolts 20 and 21, permitting removal and replacement of the protective devices H and L as a unit, preferably with shunt member 30 inserted into receptacles 29. Other variations and modifications of the specific embodiment of the invention described above will be apparent to those skilled in the art and are intended to be within the scope of the appended claims.

I claim as my invention:

1. A device for protection against electrical breakdown of the insulation in an insulated pipe joint between adjacent electrically conductive sections of a pipe line upon imposition of high voltage between said sections and permitting low voltage current to flow between said sections comprising, a circuit interconnecting said adjacent pipe sections to by-pass the insulation in said joint including a demountable means providing a gap therebetween for preventing passage of current through the circuit except above predetermined high voltage, a second circuit in parallel with said demountable means including an electrically conductive substance which offers decreasing resistance with increasing low voltage potentials but which shatters when subjected to high voltage potential, and a third circuit in shunt relationship to said first and second circuits including a removable segment, whereby said third circuit may be closed to interconnect the adjacent pipe sections during periods when the elements of either of the other circuits are being handled during maintenance or repair and may be open during other periods.

2. A device for protection against electrical break-down of the insulation in an insulated pipe joint between adjacent electrically conductive sections of a pipe line upon imposition of high voltage between said sections and permitting low voltage current to flow between said sections, comprising a panel enclosed within a housing comprising a base on which said panel is mounted and a removable cover comprising top and side walls, a pair of bus bars providing space therebetween mounted on said panel, an element composed of an electrically conductive substance which offers decreasing resistance with increasing low voltage potentials but which shatters when subjected to high voltage potential also mounted on said panel, a pair of jacks mounted in said panel, a stiff U-bar connection adapted for insertion into and removal from said jacks to electrically connect and disconnect the same, said U-bar being of dimensions permitting its total inclusion within the cross-sectional area of said cover, and the legs of said U-bar providing a section of larger diameter than said jacks for limiting the extent of insertion thereinto and being of such length that when so inserted the bar extends beyond the plane intercepted by the adjacent wall of said cover when in place, a pair of apertures in said panel spaced to receive the legs of said bar of diameter to receive the legs of said U-bar, including the said section thereof of larger diameter, in position to be totally enclosed by said cover when in place, one of said jacks, one of said bus bars and one side of said conductive element being interconnected as one group, the other of said jacks, the other of said bus bars and the other side of said element being interconnected as a second group, and a conductive lead from each of the so interconnected groups exteriorly of the device for connection to the aforesaid pipe sections on opposite sides of said insulated joints.

References Cited in the file of this patent

UNITED STATES PATENTS

| | | |
|---|---|---|
| 390,196 | Acheson | Oct. 2, 1888 |
| 768,175 | Fritchle | Aug. 23, 1904 |
| 1,171,166 | Brach | Feb. 8, 1916 |
| 1,545,646 | Everett | July 14, 1925 |
| 2,424,986 | Hubbell | Aug. 5, 1947 |

FOREIGN PATENTS

| | | |
|---|---|---|
| 588,072 | Great Britain | May 13, 1947 |